(12) United States Patent
Nakayama et al.

(10) Patent No.: US 11,365,154 B2
(45) Date of Patent: Jun. 21, 2022

(54) SILICON NITRIDE-BASED SINTERED BODY AND CUTTING INSERT

(71) Applicant: NGK SPARK PLUG CO., LTD., Aichi (JP)

(72) Inventors: Hiroko Nakayama, Komaki (JP); Atsushi Komura, Kiyosu (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 513 days.

(21) Appl. No.: 16/088,133

(22) PCT Filed: Mar. 30, 2017

(86) PCT No.: PCT/JP2017/013325
§ 371 (c)(1),
(2) Date: Sep. 25, 2018

(87) PCT Pub. No.: WO2017/170899
PCT Pub. Date: Oct. 5, 2017

(65) Prior Publication Data
US 2020/0299199 A1   Sep. 24, 2020

(30) Foreign Application Priority Data

Mar. 31, 2016  (JP) .............................. JP2016-072222

(51) Int. Cl.
*C04B 35/584* (2006.01)
*B23B 27/14* (2006.01)

(52) U.S. Cl.
CPC ............ *C04B 35/584* (2013.01); *B23B 27/14* (2013.01); *C04B 2235/3206* (2013.01);
(Continued)

(58) Field of Classification Search
CPC .......... C04B 35/584; C04B 2235/3206; C04B 2235/3217; C04B 2235/3225; C04B 2235/5445; B23B 27/14
See application file for complete search history.

(56) References Cited

U.S. PATENT DOCUMENTS

| 5,767,026 | A | * | 6/1998 | Kondoh | ................ C04B 35/597 501/97.1 |
| 2002/0084103 | A1 | * | 7/2002 | Komatsu | ................ H01L 23/15 174/255 |

(Continued)

FOREIGN PATENT DOCUMENTS

| EP | 0 667 323 A2 | 8/1995 |
| JP | 5-23921 A | 2/1993 |

(Continued)

OTHER PUBLICATIONS

International Preliminary Report on Patentability dated Oct. 2, 2018 and English translation of the Written Opinion in PCT/JP2017/013325.

(Continued)

*Primary Examiner* — Bryan D. Ripa
*Assistant Examiner* — Cameron K Miller
(74) *Attorney, Agent, or Firm* — Sughrue Mion, PLLC

(57) ABSTRACT

A silicon nitride-based sintered body containing silicon nitride-based grains, which are silicon nitride grains or sialon grains. In the silicon nitride-based sintered body, when the size of each silicon nitride-based grain is represented by its maximum grain size, the ratio of the number of silicon nitride-based grains having a maximum grain size of 1 μm or less to the number of the entire silicon nitride-based grains is 70% or higher. Furthermore, in the distribution profile of no. % of silicon nitride-based grains with respect to maximum grain size, the maximum value of no. % (i.e., maximum no. %) of silicon nitride-based grains is 15 no. %

(Continued)

or higher. Also disclosed is a cutting insert, which is formed of the silicon nitride-based sintered body.

15 Claims, 3 Drawing Sheets

(52) U.S. Cl.
CPC ............... *C04B 2235/3217* (2013.01); *C04B 2235/3225* (2013.01); *C04B 2235/5445* (2013.01)

(56) References Cited

U.S. PATENT DOCUMENTS

2003/0096695 A1* 5/2003 Abukawa ............... C04B 35/64 501/97.3
2008/0220243 A1* 9/2008 Fukudome ............ C04B 35/584 428/325

FOREIGN PATENT DOCUMENTS

| JP | 5-66901 | B2 | 9/1993 | |
|----|---------|----|--------|--|
| JP | 7-223865 | A | 8/1995 | |
| JP | H07223865 | * | 8/1995 | ......... C04B 35/5935 |
| JP | 8-104571 | A | 4/1996 | |
| JP | 2008-69031 | A | 3/2008 | |
| JP | 2008-285349 | A | 11/2008 | |
| JP | 4190257 | B2 | 12/2008 | |
| JP | 2014-141359 | A | 8/2014 | |

OTHER PUBLICATIONS

Search Report dated Jun. 13, 2017 by the International Searching Authority in counterpart International Patent Application No. PCT/JP2017/013325. (PCT/ISA/210).

Written Opinion dated Jun. 13, 2017 by the International Searching Authority in counterpart International Patent Application No. PCT/JP2017/013325. (PCT/ISA/237).

* cited by examiner

SILICON NITRIDE-BASED SINTERED BODY AND CUTTING INSERT

CROSS-REFERENCE TO RELATED APPLICATION

The present international application claims priority to Japanese Patent Application No. 2016-72222, filed Mar. 31, 2016. The contents of this application are incorporated herein by reference in their entirety.

TECHNICAL FIELD

The present disclosure relates to a silicon nitride-based sintered body containing silicon nitride-based grains, which are silicon nitride grains or sialon grains, and to a cutting insert formed of the silicon nitride-based sintered body.

BACKGROUND ART

Conventionally known cutting inserts for use in working a metallic material such as cast iron, ductile cast iron, or heat-resistant alloys are formed of, for example, a silicon nitride-based sintered body containing silicon nitride grains or sialon grains.

Patent Document 1 discloses a technique relating to a high-toughness silicon nitride-based sintered body in which the relative amount of high-aspect-ratio grains in the silicon nitride needle-like crystal grains is regulated.

Patent Document 2 discloses a technique relating to an enhanced-strength silicon nitride-based sintered body by controlling the aspect ratio and longer diameter of silicon nitride needle-like crystal grains.

Patent Document 3 discloses a technique relating to a high-cutting-performance silicon nitride-based sintered body for a cutting tool by controlling the mean shorter diameter and mean aspect ratio of silicon nitride needle-like crystal grains to ≤1 μm and ≥3, respectively.

Patent Document 4 discloses a technique relating to a fracture-toughness-enhanced silicon nitride-based tool by controlling the mean maximum diameter, mean shorter diameter, and aspect ratio of silicon nitride grains of the silicon nitride-based sintered body.

PRIOR ART DOCUMENTS

Patent Documents

Patent Document 1: Japanese Patent Publication (kokoku) No. 1993-66901
Patent Document 2: Japanese Patent Application Laid-open (kokai) No. 2008-285349
Patent Document 3: Japanese Patent Application Laid-open (kokai) No. 1993-23921
Patent Document 4: Japanese Patent No. 4190257

SUMMARY OF THE INVENTION

Problem to be Solved by the Invention

In the technical field relating to silicon nitride-based sintered bodies, fracture toughness and other properties are enhanced through controlling micro-structural properties such as mean grain size and largest grains. However, there is demand for further enhancement in such mechanical properties.

In other words, in recent years, a cutting tool made of sintered silicon nitride is required to accomplish cutting of a hard-to-cut material, to attain high cutting efficiency, and to meet other conditions, and thus breakage resistance of the cutting tool is desirably enhanced. However, in some cases, a conventional technique does not necessarily satisfy the demand.

In one aspect of the present disclosure, a silicon nitride-based sintered body and a cutting insert thereof, having high breakage resistance, are desirably provided.

Means for Solving the Problem (1) One aspect of the present disclosure is directed to a silicon nitride-based sintered body containing silicon nitride-based grains, which are silicon nitride grains or sialon grains.

In the silicon nitride-based sintered body, when the size of each silicon nitride-based grain is represented by its maximum grain size, the ratio of the number of silicon nitride-based grains having a maximum grain size of 1 μm or less to the number of the entire silicon nitride-based grains is 70% or higher. In the silicon nitride-based sintered body, in the distribution profile of no. % of silicon nitride-based grains with respect to maximum grain size, the maximum value of no. % (i.e., maximum no. %) of silicon nitride-based grains is 15 no. % or higher.

(Hereinafter, the conditions defined in the above aspect may be referred to as "condition 1.")

Notably, the unit "no. %" refers to a percentage (%) of the number of silicon nitride-based grains having a target property with respect to the number of the entire silicon nitride grains. This definition will be applied throughout the specification.

In the silicon nitride-based sintered body, the percentage of the number of silicon nitride-based grains having a maximum grain size of 1 μm or less is 70% or higher, and the maximum no. % of silicon nitride-based grains is 15 no. % or higher. As a result, silicon nitride-based grains forming a matrix have small sizes and highly uniform micro-structure, whereby the size of inter-grain bonding phase (i.e., the area of the bonding phase present between silicon nitride-based grains) is reduced. Thus, as is clear from the below-mentioned Experiments, the strength and breakage resistance of the silicon nitride-based sintered body are enhanced.

(2) In the aforementioned silicon nitride-based sintered body, the percentage of the number of silicon nitride-based grains having a maximum grain size of 1 μm or less may be 85% or higher.

As is clear from the below-mentioned Experiments, since the percentage of the number of silicon nitride-based grains having a maximum grain size of 1 μm or less is 85% or higher, the strength and breakage resistance of the silicon nitride-based sintered body are further enhanced.

(3) In the aforementioned silicon nitride-based sintered body, when a range of the maximum grain size is divided into segments each having a specific width, the number of silicon nitride-based grains falling within each segment with respect to the number of the entire silicon nitride-based grains may be employed as unit no. %.

In the above silicon nitride-based sintered body, one manner for defining unit "no. %" is exemplified.

When the segment having a specific width (i.e., a width of the segment) is narrower, the resultant maximum grain size distribution has higher precision. However, in practice, the specific width may be, for example, a width corresponding to the median of the width±0.05 μm (equivalent to a width of 0.1 μm).

The above width is not limited to 0.1 μm, and the width may be modified to 0.01 μm to 0.1 μm.

(4) Another aspect of the present disclosure is directed to a silicon nitride-based sintered body containing silicon nitride-based grains, which are silicon nitride grains or sialon grains.

In the silicon nitride-based sintered body, the size of each silicon nitride-based grain is represented by its maximum grain size, and when a range of the maximum grain size is divided into segments each having a specific width, the number of silicon nitride-based grains falling within each segment with respect to the number of the entire silicon nitride-based grains is employed as unit no. %. Separately, a 5% level of the maximum value of no. % of silicon nitride-based grains (i.e., maximum no. %) is defined as a threshold value, and a plurality of specific segments which are present at a no. % level equal to or higher than the threshold value are provided. Among the specific segments, a segment corresponding to the smallest maximum grain size is defined as a smallest segment, and a segment corresponding to the greatest maximum grain size is defined as a greatest segment.

Under the above definition, the maximum grain size corresponding to the median width of the smallest segment (i.e., the median of width of the smallest segment) and the maximum grain size corresponding to the median width of the greatest segment (i.e., the median of width of the greatest segment) fall within a range of 0.1 μm to 2.0 μm.

(Hereinafter, the Conditions Defined in the Above Aspect May be Referred to as "Condition 2.")

In the silicon nitride-based sintered body, among the specific segments present at a maximum no. % of 5% or higher, the maximum grain size corresponding to the median width of the smallest segment, and the maximum grain size corresponding to the median width of the greatest segment fall within a range of 0.1 μm to 2.0 μm. As a result, silicon nitride-based grains forming a matrix have small sizes and highly uniform micro-structure, whereby the size of intergrain bonding phase is reduced. Thus, as is clear from the below-mentioned Experiments, the strength and breakage resistance of the silicon nitride-based sintered body are enhanced.

Notably, the technical feature of (4) above may be combined with the technical feature of (1) or (2) above. Also, the same width of divided segments as employed in (3) above may also be adapted.

(5) In the aforementioned silicon nitride-based sintered body, silicon nitride-based grains having a maximum grain size of 7 μm or greater may have an aspect ratio of 2 or higher.

In such a silicon nitride-based sintered body, silicon nitride-based grains having a maximum grain size of 7 μm or greater have an aspect ratio of 2 or higher. Thus, cracking propagation diffraction effect (i.e., the effect of preventing propagation of straight line-mode cracking on the basis of diffraction) can be effectively attained, whereby the fracture toughness and breakage resistance of the silicon nitride-based sintered body are enhanced.

(6) The aforementioned silicon nitride-based sintered body may comprise silicon nitride in an amount of 80 mass % or more, yttrium or at least one rare earth element in an amount of 0.1 to 10 mass % in term of oxide, and magnesium in an amount of 0.2 to 6 mass % in term of MgO.

In the above silicon nitride-based sintered body, the composition thereof is exemplified.

(7) The aforementioned silicon nitride-based sintered body may comprise silicon nitride in an amount of 90 mass % or more, yttrium or at least one rare earth element in an amount of 0.3 to 4.5 mass % in term of oxide, and magnesium in an amount of 0.2 to 3 mass % in term of MgO.

In the above silicon nitride-based sintered body, the composition thereof is exemplified.

(8) The aforementioned silicon nitride-based sintered body may comprise sialon, yttrium or at least one rare earth element in an amount of 1 to 10 mass % in term of oxide, and aluminum in an amount of 3 to 30 mass % in term of $Al_2O_3$.

In the above silicon nitride-based sintered body, the composition thereof is exemplified.

(9) The aforementioned silicon nitride-based sintered body may comprise sialon, yttrium or at least one rare earth element in an amount of 3 to 7 mass % in term of oxide, and aluminum in an amount of 5 to 25 mass % in term of $Al_2O_3$.

In the above silicon nitride-based sintered body, the composition thereof is exemplified.

(10) Still another aspect of the present disclosure is directed to a cutting insert, which is formed of any one of the aforementioned silicon nitride-based sintered bodies.

As is clear from the below-mentioned Experiments, the cutting insert made of the above material has excellent breakage resistance.

When the cutting insert is formed of the aforementioned silicon nitride-based sintered body, high breakage resistance can be advantageously ensured in working a metallic material such as cast iron, ductile cast iron, or heat-resistant alloys. Thus, the cutting insert can attain a remarkably long service life in high-speed feed and high-efficiency metal working, working of a hard-to-cut material, and other metal working processes.

Alternatively, the silicon nitride-based sintered body containing silicon nitride-based grains, which are silicon nitride grains or sialon grains, may have the following characteristic feature.

In the silicon nitride-based sintered body, the size of each silicon nitride-based grain is represented by its maximum grain size, and when a range of the maximum grain size is divided into segments each having a specific width, the number of silicon nitride-based grains falling within each segment with respect to the number of the entire silicon nitride-based grains is employed as unit no. %. Separately, a 10% level of the maximum value of no. % of silicon nitride-based grains (i.e., maximum no. %) is defined as a threshold value, and a plurality of specific segments which are present at a no. % level equal to or higher than the threshold value are provided. Among the specific segments, a segment corresponding to the smallest maximum grain size is defined as a smallest segment, and a segment corresponding to the greatest maximum grain size is defined as a greatest segment.

Under the above definition, the maximum grain size corresponding to the median width of the smallest segment, and the maximum grain size corresponding to the median width of the greatest segment may fall within a range of 0.1 μm to 2.0 μm.

By virtue of the alternative characteristics, strength and breakage resistance of the silicon nitride-based sintered body can be enhanced.

<Hereinafter, Essential Elements of the Present Disclosure Will be Described in Detail>

The term "silicon nitride grains" refers to grains mainly formed of silicon nitride ($Si_3N_4$), and the term "sialon grains" refers to grains mainly formed of sialon. The expression "mainly formed of" means that the silicon nitride grains or sialon grains contain silicon nitride or sialon in an amount of >50 vol. %. The amount of silicon nitride or sialon may be >80 vol. %.

As is widely known in the art, sialon is a substance formed of silicon nitride in which Al and O are dissolved to form a solid solution.

Alternatively, the silicon nitride grains may be grains of silicon nitride which may contain unavoidable impurities. Also, the sialon grains may be grains of sialon which may contain unavoidable impurities.

The term "silicon nitride-based sintered body" refers to a sintered body mainly containing silicon nitride ($Si_3N_4$) or sialon (i.e., the amount thereof being >50 vol. %). In the silicon nitride-based sintered body, more than 50 vol. % of the grains are silicon nitride-based grains.

The maximum grain size is defined as a longest size of a silicon nitride-based grain among various outer diameters.

The maximum grain size is obtained by mirror-polishing a silicon nitride-based sintered body, etching the sintered body, and measuring the longest size through observation under a scanning electron microscope (SEM).

The expression "silicon nitride-based grains having a maximum grain size of 7 μm or greater have an aspect ratio of 2 or higher" refers to all the silicon nitride-based grains having a maximum grain size of 7 μm or greater among a number of silicon nitride-based grains included in the silicon nitride-based sintered body have an aspect ratio of 2 or higher.

Notably, examples of the aforementioned rare earth element include La, Ce, Sm, Er, and Yb.

Figure 1:
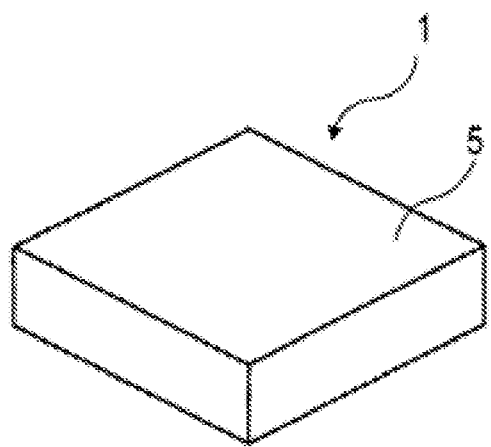
FIG. 1 Perspective view of a first embodiment of the cutting insert of the present invention.

DESCRIPTION OF REFERENCE NUMERALS 1, 11: cutting insert
3: silicon nitride grain (or sialon grain)
5, 15: silicon nitride-based sintered body

MODES FOR CARRYING OUT THE INVENTION

1. First Embodiment

[1-1. General Feature]

A first embodiment of a cutting insert formed of a silicon nitride-based sintered body will be described.

As shown in FIG. 1, a cutting insert 1 of the first embodiment has a shape defined by ISO SNGN120408T02020.

Figure 2:
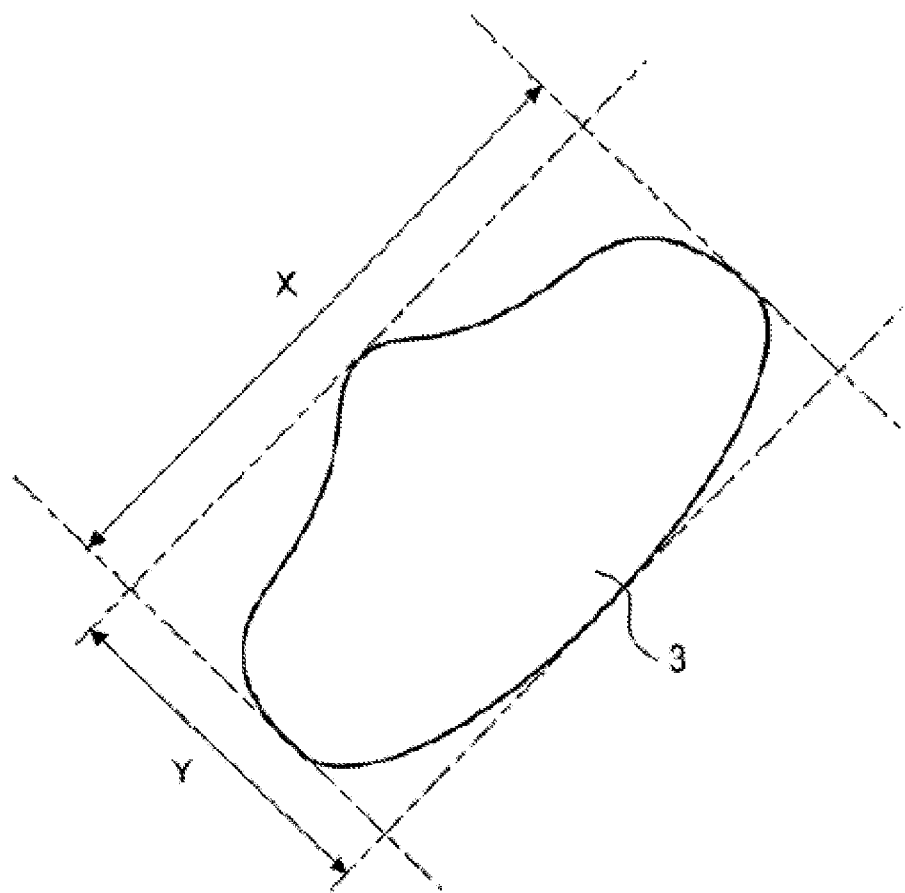
FIG. 2 Sketch illustrating maximum (longest) grain size (X) and minimum (shortest) grain size (Y) of a silicon nitride grain.

The cutting insert 1 is made of a silicon nitride-based sintered body 5 containing numerous silicon nitride grains 3 (see FIG. 2). That is, the silicon nitride-based sintered body 5 is substantially formed of silicon nitride grains 3 (e.g., ≥80 vol. %).

In the first embodiment, the following condition 1 is satisfied.

Specifically, the ratio (no. %) of the number of silicon nitride-based grains having a maximum grain size (i.e. longest grain size) of ≥1 μm to the number of the silicon nitride grains 3 contained in the silicon nitride-based sintered body 5 is 70% or higher, when the size of each silicon nitride-based grain 3 is represented by its maximum grain size X (see FIG. 2). For example, the no. % of silicon nitride-based grains having a maximum grain size (i.e. longest grain size) of ≥1 μm is ≥85 no. %. Further, in the distribution profile between no. % and maximum grain size of silicon nitride-based grains, the maximum no. % of silicon nitride grains 3 is 15 no. % or higher.

In the range of ≥1 μm of the maximum grain size, a maximum grain size corresponding to the maximum no. % (i.e., the distribution peak of silicon nitride grains 3 (Ymax in FIG. 4)): exists.

In the first embodiment, the following condition 2 is satisfied.

Specifically, when a range of the maximum grain size is divided into segments each having a specific width, the number of silicon nitride-based grains falling within each segment with respect to the number of the entire silicon nitride-based grains is employed as unit no. %. Separately, a 5% level of the maximum value of no. % of silicon nitride-based grains (i.e., maximum no. %) is defined as a threshold value, and a plurality of specific segments which are present at a no. % level equal to or higher than the threshold value are provided. Among the specific segments, a segment corresponding to the smallest maximum grain size is defined as a smallest segment, and a segment corresponding to the greatest maximum grain size is defined as a greatest segment.

Under the above definition, the maximum grain size corresponding to the median width of the smallest segment, and the maximum grain size corresponding to the median width of the greatest segment fall within a range of 0.1 μm to 2.0 μm.

In the above case, a maximum grain size corresponding to the maximum no. % (i.e., the distribution peak of silicon nitride grains (Ymax) exists within a specific range at a no. % level equal to or higher than 5%.

Notably, the aforementioned "median" refers to a median value of a specific range of the maximum grain size, which is divided into segments each having a specific width, where the number of silicon nitride grains 3 falling within each segment with respect to the number of the entire silicon nitride grains 3 is employed as unit no. %.

Moreover, in the aforementioned silicon nitride-based sintered body, silicon nitride grains 3 having a maximum grain size of 7 μm or greater have an aspect ratio of 2 or higher.

As shown in FIG. 2, the concept "aspect ratio" refers to a ratio "longest diameter/the length orthogonal to the longest diameter" of a silicon nitride grain 3. Notably, in FIG. 2, the maximum grain size X corresponds to the longest diameter, and the minimum grain size Y corresponds to the length orthogonal to the maximum grain size.

[1-2. Silicon Nitride Grains]

Next, the grain size distribution profile of silicon nitride grains 3 included in the silicon nitride-based sintered body 5 will be described in detail.

Figure 4:
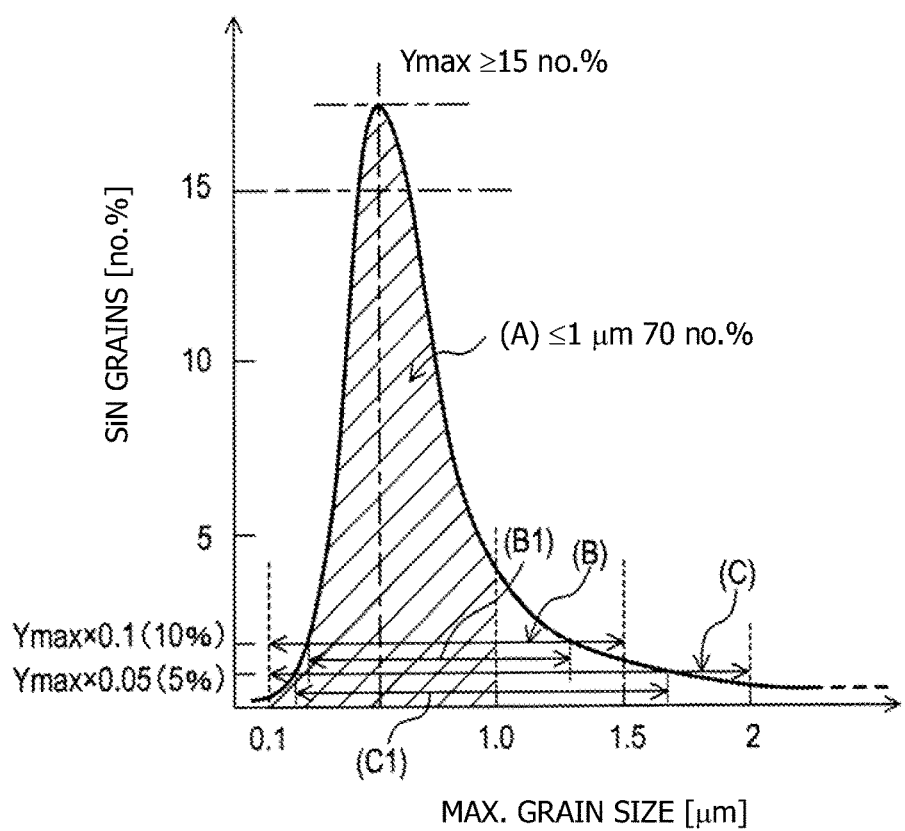
FIG. 4 Graph showing the relationship between maximum grain size and no. % of silicon nitride grains.

The size of each of the silicon nitride grains 3 included in the silicon nitride-based sintered body 5 is represented by the maximum grain size. When the range of the maximum grain size is divided into segments each having a specific width (e.g., median±0.05 μm), the number of silicon nitride grains 3 falling within each segment with respect to the number of the entire silicon nitride grains 3 is employed as unit no. %. In this case, an example of the grain size distribution profile of the silicon nitride grains 3 is shown in FIG. 4.

Actually, the grain size distribution profile of the silicon nitride grains 3 assumes a histogram consisting of segments having a specific width and representing the number of gains (i.e., no. %). However, in FIG. 4, top points (i.e., no. % values) of the segments corresponding to the each median are smoothly connected to one another, to thereby schematically show a smooth grain size distribution profile of the silicon nitride grains 3. The aforementioned width of each segment corresponds to the width of each bin in the histogram.

Notably, the ratio of grains having a maximum grain size X (i.e., content, no. %) may be derived by the following formula (1):

Amount of grains having a maximum grain size $X$
(no. %)=(number of grains having a maximum grain size $X$/the number of the entire grains)×100    (1).

Notably, in the case where the maximum grain size is assigned to a corresponding segment having a specific width, the concept "the number of grains having a maximum grain size X" refers to the "number of grains having a maximum grain size X included in the segment having the width."

Thus, the domain where "the no. % of grains having a maximum grain size of 1 μm or less of ≥70 no. %" may refer to a total percentage of ≥70% of the slanted-line domain (A) in FIG. 4.

Furthermore, the concept "no. % of silicon nitride-based grains having a maximum grain size of ≤1 μm is ≥85 no. %" may refer to the percent ratio of the sum of no. % of ≥85% in the slanted-line domain (A) in FIG. 4.

The concept "the maximum no. % is ≥15 no. %" refers to the case where the maximum value of no. % (i.e., maximum no. %, Ymax) of silicon nitride-based grains is 15 no. % or higher in the distribution profile shown in, for example FIG. 4.

Figure 5:
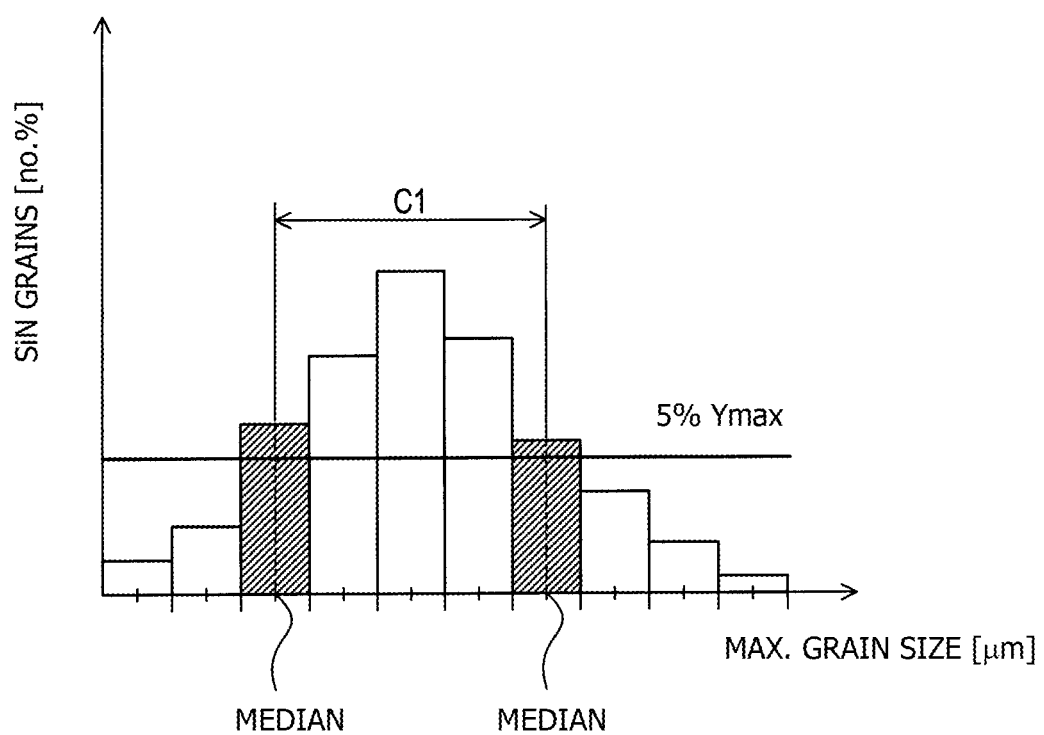
FIG. 5 Graph showing the maximum grain size corresponding to the median width of the smallest segment, and the maximum grain size corresponding to the median width of the greatest segment, among the specific segments present at a Ymax of ≥5% in a maximum grain size distribution profile of silicon nitride grains.

Also, in the distribution profile shown in, for example FIG. 5, the concept "the maximum grain size corresponding to the median width of the smallest segment, and the maximum grain size corresponding to the median width of the greatest segment fall within a range of 0.1 μm to 2.0 μm" refers to the median value (C1) in each segment where the maximum no. % is 25% exists within a range of 0.1 μm to 2.0 μm.

In other words, the maximum grain size represented by the median (i.e., the smallest median) present in the smaller maximum grain size region (in the slanted-line domain on the left side of FIG. 5), and the maximum grain size represented by the median (i.e., the largest median) present in the larger maximum grain size region (in slanted-line domain on the right side of FIG. 5) fall within a range of 0.1 Lm to 2.0 μm.

Notably, the span between the minimum median and the largest median shown in, for example, FIG. 4, corresponds to a range C shown in FIG. 4 (see FIG. 5). More specifically, in FIG. 4, the range corresponds to a range of Ymax (i.e., maximum no. %)×0.05 (i.e., ≥5% of Ymax).

Also, in the distribution profile shown in, for example FIG. 5 (5% should be changed to 10%), the concept "the maximum grain size corresponding to the median width of the smallest segment, and the maximum grain size corresponding to the median width of the greatest segment fall within a range of 0.1 μm to 1.5 μm" refers to the range of the medium where the maximum no. % (see B1 of FIG. 4) is ≥10% exists within a range of 0.1 Lm to 1.5 μm, in a maximum grain size distribution profile shown in, for example, FIG. 5.

In other words, the maximum grain size represented by the median (i.e., the smallest median) present in the smaller maximum grain size region (in the slanted-line domain on the left side of FIG. 5), and the maximum grain size represented by the median (i.e., the largest median) present in the larger maximum grain size region (in slanted-line domain on the right side of FIG. 5) fall within a range of 0.1 μm to 1.5 μm.

Notably, the span between the minimum median and the largest median shown in, for example, FIG. 4, corresponds to a range B1 shown in FIG. 4. More specifically, in FIG. 4, the range corresponds to a range of Ymax (i.e., maximum no. %)×0.1 (i.e., ≥10% of Ymax).

[1-3. Production Method]

Next, methods for producing a silicon nitride-based sintered body 5 and a cutting insert 1 of the first embodiment will be described.

Silicon nitride powder (BET specific surface area: 8 to 20 m$^2$/g) was used as a starting material and mixed with Yb$_2$O$_3$ powder (av. particle size: 1 μm), Sm$_2$O$_3$ powder (av. particle size: 1 μm), or Lu$_2$O$_3$ powder (av. particle size: 1 μm) (2 mass %); Al$_2$O$_3$ powder (av. particle size: 1 μm) (0.5 mass %), and MgO powder (av. particle size: 1 μm) (2 mass %), the balance being the silicon nitride powder.

The thus-prepared powder mixture was placed with ethanol in a ball mill having an inner wall made of silicon nitride. The crushing medium used was silicon nitride balls (i.e., SN balls) having size φ: 2 mm, φ: 6 mm, and φ: 10 mm in proportions of 1:2:7 or 0:0:10 (by volume). Crushing/mixing was performed for about 96 to about 240 hours, to thereby prepare a mixture (slurry).

Notably, when silicon nitride balls having size φ: 2 mm, φ: 6 mm, and φ: 10 mm in proportions of 0:0:10 (by volume) were used, crushing/mixing was performed for about 168 to about 240 hours. That is, when large silicon nitride balls were used in predominant amounts, crushing time was prolonged.

Subsequently, the above-prepared slurry was sequentially boiled in hot water, dried, and passed through a sieve having an opening size of 250 μm, to thereby obtain a mixed powder.

Then, the powder mixture was press-formed at 1,000 kgf/cm², to thereby yield a compact having a tool shape (ISO standards) of SNGN120408T02020.

The compact was subjected to cold isostatic pressing (CIP) at 1,500 kgf/cm².

Subsequently, the obtained CIP compact was sintered in a silicon nitride container under nitrogen ($N_2$). The sintering temperature profile included heating at 10° C./min, maintaining at 1,750° C. for 2 hours, and cooling at 20° C./min. Notably, when the temperature elevation rate is slower than 10° C./min, growth of silicon nitride grains is promoted. Therefore, the temperature elevation rate is preferably 10° C./min or faster.

In order to prevent generation of micropores, a post step may be added. The post step is secondary sintering through hot isostatic pressing (HIP).

Through the aforementioned production procedure, the silicon nitride-based sintered body 5 was manufactured.

Thereafter, the surface of the silicon nitride-based sintered body 5 was grinded so as to form a final tool shape (SNGN120408T02020, ISO standards), to thereby obtain a cutting insert 1.

[1-4. Effects]

Effects attained in the first embodiment will be described.

In the silicon nitride-based sintered body 5 (i.e., the cutting insert 1) of the first embodiment, the ratio of the number of silicon nitride grains 3 having a maximum grain size of ≤1 μm to the number of the entire silicon nitride grains 3 is ≥70% (e.g., ≥85 no. %). In addition, in the distribution profile of no. % of silicon nitride grains 3 with respect to maximum grain size, the maximum value of no. % (i.e., maximum no. %) of silicon nitride grains 3 is ≥15 no. %.

As a result, silicon nitride grains 3 have small sizes and highly uniform micro-structure, whereby the size of intergrain bonding phase is reduced. Thus, the strength and breakage resistance of the silicon nitride-based sintered body 5 are enhanced.

In the first embodiment, among the specific segments present at a maximum no. % of ≥5%, the maximum grain size corresponding to the median width of the smallest segment, and the maximum grain size corresponding to the median width of the greatest segment fall within a range of 0.1 μm to 2.0 μm.

As a result, silicon nitride grains 3 have small sizes and highly uniform micro-structure, whereby the size of intergrain bonding phase is reduced. Thus, from this viewpoint, the strength and breakage resistance of the silicon nitride-based sintered body 5 are enhanced.

Also, in the first embodiment, silicon nitride grains 3 having a maximum grain size of ≥7 μm have an aspect ratio of ≥2. Thus, the effect of preventing propagation of cracking on the basis of diffraction can be effectively attained, whereby the fracture toughness of the silicon nitride-based sintered body is enhanced, and the breakage resistance is further enhanced.

2. Second Embodiment

[2-1. General Feature]

A second embodiment will next be described. The same elements as employed in the first embodiment will be simplified or omitted.

Figure 3:
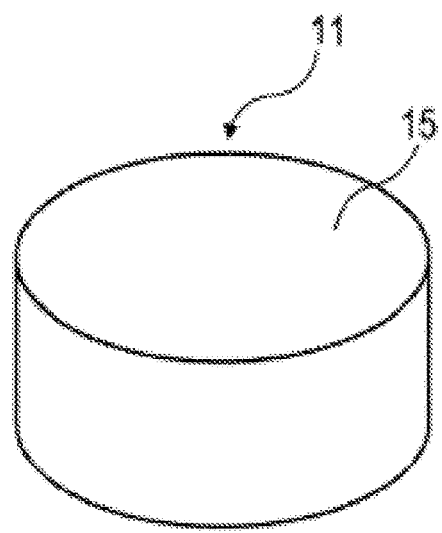
FIG. 3 Perspective view of a second embodiment of the cutting insert of the present invention.

As shown in FIG. 3, a cutting insert 11 of the second embodiment has a shape of RNGN120700T02020 (ISO standards) (i.e., a columnar shape).

The cutting insert 11 is formed of a silicon nitride-based sintered body 15 including a plurality of sialon grains 3 (see FIG. 2). That is, the silicon nitride-based sintered body 15 is substantially formed of sialon grains 13 (e.g., ≥80 vol. %).

Also, as shown in FIG. 2, the sialon grains 3 have the same shape as that of the silicon nitride grains 3 of the first embodiment. Notably, the silicon nitride-based sintered body 15 of the second embodiment has substantially the same structure, except that the silicon nitride grains 3 were replaced by sialon grains 3.

More specifically, the cutting insert 11 satisfies the following conditions 1 and 2.

Regarding to condition 1, in the silicon nitride-based sintered body 15, the ratio of the number of sialon grains 3 having a maximum grain size (X, see FIG. 2) of ≤1 μm to the number of the entire sialon grains 13 is ≥70% (e.g., ≥85 no. %). In addition, in the distribution profile of no. % of sialon grains 3 with respect to maximum grain size, the maximum value of no. % (i.e., maximum no. %) of sialon grains 3 is ≥15 no. %.

In the range of ≥1 μm of the maximum grain size, a maximum grain size corresponding to the maximum no. % (i.e., the distribution peak of sialon grains 3 (Ymax in FIG. 4)): exists.

Regarding condition 2, a 5% level of the maximum value of no. % of sialon grains 3 (i.e., maximum no. %) is defined as a threshold value, and a plurality of specific segments which are present at a no. % level equal to or higher than the threshold value are provided. Among the specific segments, a segment corresponding to the smallest maximum grain size is defined as a smallest segment, and a segment corresponding to the greatest maximum grain size is defined as a greatest segment.

In this case, the maximum grain size corresponding to the median width of the smallest segment, and the maximum grain size corresponding to the median width of the greatest segment fall within a range of 0.1 μm to 2.0 μm.

In this case, a maximum grain size corresponding to the maximum no. % (i.e., corresponding to the peak value Ymax) is present within a specific range where the maximum value is 25%.

In the aforementioned silicon nitride-based sintered body, sialon grains 3 having a maximum grain size of ≥7 μm have an aspect ratio of ≥2.

[2-2. Production method]

Next, methods for producing the silicon nitride-based sintered body 15 and the cutting insert 11 of the second embodiment will be described.

The production method in the second embodiment is almost the same as employed in the first embodiment. The following description will be focused on different points.

<Starting Material>

$Yb_2O_3$ powder (av. particle size: 1 μm) (5 mass %), $Al_2O_3$ powder (av. particle size: 1 μm) (2 mass %), and AlN powder (av. particle size: 1 μm) (8 mass %), the balance being the silicon nitride powder, were used as starting materials. The used silicon nitride powder was found to have a specific surface area (BET: 8 to 20 m²/g)

<Crushing method>

The same crushing method as employed in the first embodiment was performed.

<Molding method>

The same molding method as employed in the first embodiment was performed, except that the molded product had a shape of RNGN120700T02020.

<Sintering Method>

The sintering temperature was adjusted to 1,730° C.

Other production conditions were the same as those employed in the first embodiment. Through such a production procedure, the silicon nitride-based sintered body 15 (i.e., the cutting insert 11) of the second embodiment was produced.

[2-3. Effects]

In the silicon nitride-based sintered body 15 (i.e., the cutting insert 11) of the second embodiment, the ratio of the number of sialon grains 3 having a maximum grain size of ≤1 μm to the number of the entire sialon grains is ≥70%. In addition, in the distribution profile of no. % of sialon grains 3 with respect to maximum grain size, the maximum value of no. % (i.e., maximum no. %) of sialon grains 3 is ≥15 no. %.

As a result, sialon grains 3 have small sizes and highly uniform micro-structure, whereby the size of inter-grain bonding phase is reduced. Thus, the strength and breakage resistance of the silicon nitride-based sintered body 15 are enhanced.

In the second embodiment, among the specific segments present at a maximum no. % of ≥5%, the maximum grain size corresponding to the median width of the smallest segment, and the maximum grain size corresponding to the median width of the greatest segment fall within a range of 0.1 μm to 2.0 μm.

As a result, sialon grains 3 have small sizes and highly uniform micro-structure, whereby the size of inter-grain bonding phase is reduced. Thus, from this viewpoint, the strength and breakage resistance of the silicon nitride-based sintered body 15 are enhanced.

Also, in the second embodiment, sialon grains 3 having a maximum grain size of ≥7 μm have an aspect ratio of ≥2. Thus, the effect of preventing propagation of cracking on the basis of diffraction can be effectively attained, whereby the fracture toughness of the silicon nitride-based sintered body is enhanced, and the breakage resistance is further enhanced.

3. Experiments

Next will be described the following Experiments, which were conducted to verify the effect of the present disclosure.

<Experiment 1>

In Experiment 1, the silicon nitride-based sintered body (i.e., the cutting insert) of the first embodiment was tested.

Specifically, in Experiment 1, a silicon nitride-based sintered body (i.e., a cutting insert) according to the first embodiment, the sintered body mainly formed of silicon nitride grains, was produced, and breakage resistance and other properties of the sintered body were investigated.

Production conditions other than those employed in Experiment 1 are the same as employed in the first embodiment. The shape of the cutting insert is SNGN120408T02020 (ISO standards).

More specifically, samples used in the Experiment 1 were produced under the production conditions shown in TABLE 1 below. The samples were silicon nitride-based sintered bodies of Examples 1 to 10 and Comparative Examples 1 to 8. Each sintered body was grinded, to thereby provide a cutting insert.

Notably, samples of Examples 1 to 10 fall within the scope of the present disclosure, and samples of Comparative Examples 1 to 8 fall outside the scope of the present disclosure.

Samples of Examples 1 to 10 were prepared under the same conditions as employed in the first embodiment, except that BET specific surface area, crushing medium, and crushing time were modified within the ranges shown in TABLE 1. In one mode, the BET specific surface area was tuned to 11 to 17%, and the crushing time was tuned to 96 to 240 hours.

In TABLE 1, the "BET specific surface area of silicon nitride ($Si_3N_4$) material" is denoted simply by "MATERIAL BET," the "SN ball volume proportions" is denoted simply by "BALL VOL. PROPORTIONS" (the same expressions employed in TABLE 3).

When silicon nitride balls having size φ: 2 mm, φ: 6 mm, and φ: 10 mm in proportions of 0:0:10 (by volume) were used, the mixture was subjected to crushing/mixing for about 168 to about 240 hours.

Samples of Comparative Examples 1 to 8 were prepared under the same conditions as employed in the first embodiment, except that any of BET specific surface area, crushing medium, and crushing time was modified to fall outside the ranges of Examples 1 to 10.

Each cutting insert of the corresponding sample was cut along a face passing the gravity center, and the cut face was mirror-polished. The polished face was etched and then observed under a scanning electron microscope (i.e., SEM observation). More specifically, the number of silicon nitride grains present in an observation field (64 μm×48 μm) in the vicinity of the gravity center was counted through SEM observation. Also, the maximum grain size X and the smallest grain size Y of each silicon nitride grain were determined, to thereby derive an aspect ratio (i.e., X/Y).

Occurrence of the thus-determined maximum grain size X of each silicon nitride grain with respect to a width of, for example, 0.1 μm was calculated, to thereby obtain a maximum grain size distribution profile as shown in FIG. 4.

Notably, in order to enhance measurement precision, microscopic observation is preferably performed in two or more fields. When two or more fields (e.g., 2 fields) were observed, all the data obtained from the fields may be employed for analysis.

From the data obtained through observation of the silicon nitride grains, the following data were determined:

"no. % of grains a maximum grain size of ≤1 μm (DATA 1)";

"maximum no. % (DATA 2)";

"positions of the maximum grain size corresponding to the median width of the smallest segment, and the maximum grain size corresponding to the median width of the greatest segment, among the specific segments present at a maximum no. % of ≥5% (DATA 3)";

"positions of the maximum grain size corresponding to the median width of the smallest segment, and the maximum grain size corresponding to the median width of the greatest segment, among the specific segments present at a maximum no. % of ≥10% (DATA 4)"; and "aspect ratio of silicon nitride grains having a maximum grain size of ≥7 μm (DATA 5)." TABLE 2 shows the results.

Notably, the aforementioned "DATA 3" relates to the maximum grain size corresponding to the median width of the smallest segment, and the maximum grain size corresponding to the median width of the greatest segment, among the specific segments present at a maximum no. % of ≥5% (i.e., size of grains corresponding to a maximum no. % of ≥5%). The aforementioned "DATA 4" relates to the maximum grain size corresponding to the median width of the smallest segment, and the maximum grain size corresponding to the median width of the greatest segment, among the specific segments present at a maximum no. % of ≥10% (i.e., size of grains corresponding to a maximum no. % of ≥10%).

Notably, the concept "the aspect ratio of silicon nitride grains having a maximum grain size of ≥7 μm" is a minimum determined value thereof.

Further, each sample was subjected to a cutting test. More specifically, the sample was subjected to a conventional working process of cast iron (in this case, lathe turning). The maximum flank wear amount and the feed speed to breakage were investigated. TABLE 2 shows the results.

In TABLE 2, "the maximum grain size corresponding to the median width of the smallest segment, and the maximum grain size corresponding to the median width of the greatest segment, among the specific segments present at a maximum no. % of ≥5%" (DATA 3) is simply referred to as "≥5% MEDIAN VALUE 1," and "the maximum grain size corresponding to the median width of the smallest segment, and the maximum grain size corresponding to the median width of the greatest segment, among the specific segments present at a maximum no. % of ≥10%" (DATA 4) is simply referred to as "≥10% MEDIAN VALUE 2." DATA 5, "the aspect ratio of silicon nitride grains having a maximum grain size of ≥7 μm" is simply referred to as "ASPECT RATIO," similar to TABLE 4. However, in TABLE 4, silicon nitride grains were changed to sialon grains. Also, in TABLE 2, the term "maximum flank wear amount" is denoted simply "MAXIMUM WEAR AMOUNT," and "the feed speed to cause breakage" is denoted by "break-CAUSING SPEED."

<Working Conditions>
Cutting edge treatment: 0.2×20°
Working material: FC250 (JIS)
Cutting speed: 150 m/min
Cutting depth: 2.0 mm
Feed speed: 0.6 mm/rev to 0.05 mm/rev, depending on working step
Cutting oil: None (dry)

TABLE 1

| | COMPOSITION [mass %] | | | | | | | MATERIAL BET [m²/g] | BALL VOL. PROPORTIONS (φ2:φ6:φ10) | CRUSHING TIME [hour] | HEATING RATE [° C./min] | COOLING RATE [° C./min] |
|---|---|---|---|---|---|---|---|---|---|---|---|---|
| | Si₃N₄ | Yb₂O₃ | Sm₂O₃ | Lu₂O₃ | Al₂O₃ | MgO | AlN | | | | | |
| EX. 1 | 95.5 | 2 | — | — | 0.5 | 2 | — | 17 | 1:2:7 | 240 | 10 | 20 |
| EX. 2 | 95.5 | 2 | — | — | 0.5 | 2 | — | 17 | 1:2:7 | 168 | 10 | 20 |
| EX. 3 | 95.5 | 2 | — | — | 0.5 | 2 | — | 17 | 1:2:7 | 96 | 10 | 20 |
| EX. 4 | 95.5 | 2 | — | — | 0.5 | 2 | — | 17 | 0:0:10 | 240 | 10 | 20 |
| EX. 5 | 95.5 | 2 | — | — | 0.5 | 2 | — | 11 | 1:2:7 | 240 | 10 | 20 |
| EX. 6 | 95.5 | 2 | — | — | 0.5 | 2 | — | 11 | 1:2:7 | 168 | 10 | 20 |
| EX. 7 | 95.5 | 2 | — | — | 0.5 | 2 | — | 11 | 0:0:10 | 240 | 10 | 20 |
| EX. 8 | 95.5 | 2 | — | — | 0.5 | 2 | — | 11 | 0:0:10 | 168 | 10 | 20 |
| EX. 9 | 95.5 | — | 2 | — | 0.5 | 2 | — | 17 | 1:2:7 | 240 | 10 | 20 |
| EX. 10 | 95.5 | — | — | 2 | 0.5 | 2 | — | 17 | 1:2:7 | 240 | 10 | 20 |
| COMP. 1 | 95.5 | 2 | — | — | 0.5 | 2 | — | 7 | 1:2:7 | 240 | 10 | 20 |
| COMP. 2 | 95.5 | 2 | — | — | 0.5 | 2 | — | 7 | 0:0:10 | 240 | 10 | 20 |
| COMP. 3 | 95.5 | 2 | — | — | 0.5 | 2 | — | 11 | 3:3:4 | 168 | 10 | 20 |
| COMP. 4 | 95.5 | 2 | — | — | 0.5 | 2 | — | 7 | 3:3:4 | 240 | 10 | 20 |
| COMP. 5 | 95.5 | 2 | — | — | 0.5 | 2 | — | 11 | 0:0:10 | 72 | 10 | 20 |
| COMP. 6 | 95.5 | 2 | — | — | 0.5 | 2 | — | 11 | 1:2:7 | 72 | 10 | 20 |
| COMP. 7 | 95.5 | 2 | — | — | 0.5 | 2 | — | 11 | 0:0:10 | 96 | 10 | 20 |
| COMP. 8 | 95.5 | 2 | — | — | 0.5 | 2 | — | 11 | 5:4:1 | 168 | 10 | 20 |

TABLE 2

| | DATA 1 no.% OF ≤1 μm MAX. SIZE GRAINS [%] | DATA 2 MAX. no. % [%] | DATA 3 MEDIAN 1 (≥5%) [μm] | DATA 4 MEDIAN 2 (≥10%) [μm] | DATA 5 ASPECT RATIO | MAX. WEAR AMOUNT [mm] | BREAK H-CAUSING SPEED [mm/rev] | TOTAL SCORE |
|---|---|---|---|---|---|---|---|---|
| EX. 1 | 92 | 21 | 0.1~1.2 | 0.1~1.0 | 3.2 | 0.5 | 1.9 | ⊚ |
| EX. 2 | 85 | 16 | 0.1~1.4 | 0.1~1.0 | 2.9 | 0.6 | 1.8 | ○ |
| EX. 3 | 90 | 20 | 0.1~1.8 | 0.2~1.7 | 2.5 | 0.6 | 1.8 | ○ |
| EX. 4 | 71 | 15 | 0.1~2.2 | 0.2~1.5 | 2.2 | 0.8 | 1.7 | Δ |
| EX. 5 | 75 | 15 | 0.1~2.8 | 0.1~1.6 | 2.5 | 0.9 | 1.7 | Δ |
| EX. 6 | 68 | 14 | 0.1~1.8 | 0.1~1.2 | 2.5 | 0.6 | 1.8 | ○ |
| EX. 7 | 64 | 12 | 0.1~1.9 | 0.1~1.4 | 2.2 | 0.8 | 1.7 | Δ |
| EX. 8 | 67 | 14 | 0.1~2.0 | 0.1~1.6 | 2.4 | 0.9 | 1.7 | Δ |
| EX. 9 | 93 | 26 | 0.2~1.1 | 0.2~0.8 | 2.9 | 0.6 | 1.9 | ⊚ |
| EX. 10 | 95 | 26 | 0.1~1.1 | 0.1~0.8 | 3.4 | 0.5 | 1.9 | ⊚ |
| COMP. 1 | 66 | 13 | 0.1~2.2 | 0.2~1.8 | 2.5 | 1 | 1.5 | X |
| COMP. 2 | 67 | 14 | 0.08~2.2 | 0.2~1.7 | 2.4 | 1 | 1.5 | X |
| COMP. 3 | 69 | 15 | 0.08~2.2 | 0.2~1.8 | 2.4 | 1 | 1.6 | X |
| COMP. 4 | 64 | 14 | 0.1~2.2 | 0.2~1.7 | 1.8 | 1.5 | INITIAL BREAKAGE | X X |
| COMP. 5 | 71 | 13 | 0.08~2.0 | 0.2~1.8 | 1.7 | 1.3 | INITIAL BREAKAGE | X X |

TABLE 2-continued

| | DATA 1 no.% OF ≤1 μm MAX. SIZE GRAINS [%] | DATA 2 MAX. no. % [%] | DATA 3 MEDIAN 1 (≥5%) [μm] | DATA 4 MEDIAN 2 (≥10%) [μm] | DATA 5 ASPECT RATIO | MAX. WEAR AMOUNT [mm] | BREAK H-CAUSING SPEED [mm/rev] | TOTAL SCORE |
|---|---|---|---|---|---|---|---|---|
| COMP. 6 | 68 | 15 | 0.08~1.8 | 0.1~1.6 | 2.4 | 0.9 | 1.6 | X |
| COMP. 7 | 68 | 16 | 0.08~1.8 | 0.1~1.6 | 1.7 | 1.1 | 1.5 | X |
| COMP. 8 | 70 | 12 | 0.1~2.6 | 0.1~2.0 | 2.4 | 1.3 | INITIAL BREAKAGE | X X |

In the column of TOTAL SCORE in TABLE 2, rating "◯◯" denotes a case of the smallest maximum flank wear amount and the largest feed speed to breakage (i.e., the most excellent characteristics). Rating "◯" denotes a case of a maximum flank wear amount of 0.6 mm and a feed speed to breakage of 1.8 mm/rev (i.e., excellent characteristics). Rating "Δ" denotes a case of a maximum flank wear amount of 0.8 to 0.9 mm and a feed speed to breakage of 1.7 mm/rev (i.e., good characteristics). Rating "X" denotes a case of a maximum flank wear amount of ≥0.9 mm and a feed speed to breakage of ≤1.6 mm/rev (i.e., poor characteristics). Rating "XX" denotes a case where initial breakage occurred.

As is clear from TABLE 2, samples of Examples 1 to 5, 9, and 10, satisfying the aforementioned condition 1, exhibited a small maximum flank wear amount (≤0.9 mm) and a large feed speed to breakage (≥1.7 mm/rev). That is, the samples having such high breakage resistance were found to be preferred.

Among these samples, samples of Examples 1 to 3, 9, and 10 exhibited a smaller maximum flank wear amount (≤0.6 mm) and a larger feed speed to breakage (≥1.8 mm/rev). That is, the samples were found to be more preferred.

Also, samples of Examples 1 to 3, and 6 to 10, satisfying the aforementioned condition 2, exhibited a small maximum flank wear amount (≤0.9 mm) and a large feed speed to breakage (≥1.7 mm/rev). That is, the samples were found to be preferred.

In contrast, samples of Comparative Examples 1 to 3, and 7 exhibited a large flank wear amount and a small feed speed to breakage, indicating that the samples were not preferred. Samples of Comparative Examples 4, 5, and 8 underwent undesired breakage at an initial stage. A sample of Comparative Example 6, exhibiting a small feed speed to breakage, was found to be non-preferred.

<Experiment 2>

In Experiment 2, the silicon nitride-based sintered body (i.e., the cutting insert) of the second embodiment was tested.

Specifically, in Experiment 2, a sialon sintered body (i.e., a cutting insert) according to the second embodiment (i.e., a silicon nitride-based sintered body mainly formed of sialon grains) was produced, and breakage resistance and other properties of the sintered body were investigated. The shape of the cutting insert is RNGN120700T02020 (ISO standards).

More specifically, samples used in the Experiment 2 were produced under the production conditions shown in TABLE 3 below. The samples were sialon sintered bodies of Examples 11 and 12, and Comparative Example 9. Each sintered body was grinded, to thereby provide a cutting insert. Notably, the production conditions other than those shown in TABLE 3 are the same as those employed in Experiment 1.

Notably, samples of Examples 11 and 12 fall within the scope of the present disclosure, and samples of Comparative Example 9 fall outside the scope of the present disclosure.

Further, each cutting insert of the corresponding sample produced in Experiment 2 was subjected to the same SEM observation as performed in Experiment 1. The number of sialon grains present in an observation field (64 μm×48 μm) in the vicinity of the gravity center was counted. Also, the maximum grain size X and the smallest grain size Y of each sialon grain were determined, to thereby derive an aspect ratio (i.e., X/Y).

Occurrence of the thus-determined maximum grain size X of each sialon grain with respect to a width of, for example, 0.1 μm was calculated, to thereby obtain a maximum grain size distribution profile.

From the data obtained through observation of the sialon grains, the data 1 to 5 were determined in a manner similar to that of Experiment 1. TABLE 4 shows the results.

Next, each sample was subjected to a cutting test. Specifically, the sample was employed in cutting (i.e., lathe turning) a heat-resistant alloy sample under the below-specified conditions. The workable length to flaking or breakage was determined. TABLE 4 shows the results.

<Working Conditions>
Cutting edge treatment: 0.2×20°
Working material: Inconel 718
Cutting speed: 180 m/min
Cutting depth: 1.5 mm
Feed speed: 0.2 mm/rev
Cutting oil: Yes (wet)

TABLE 3

| | COMPOSITION [mass %] | | | | | | | MATERIAL BET [m$^2$/g] | BALL VOL. PROPORTIONS (φ2:φ6:φ10) | CRUSHING TIME [hour] | HEATING RATE [° C./min] | COOLING RATE [° C./min] |
|---|---|---|---|---|---|---|---|---|---|---|---|---|
| | Si$_3$N$_4$ | Yb$_2$O$_3$ | Sm$_2$O$_3$ | Lu$_2$O$_3$ | Al$_2$O$_3$ | MgO | AlN | | | | | |
| EX. 11 | 85 | 5 | — | — | 2 | — | 8 | 11 | 1:2:7 | 240 | 10 | 20 |
| EX. 12 | 85 | 5 | — | — | 2 | — | 8 | 17 | 1:2:7 | 240 | 10 | 20 |
| COMP. 9 | 85 | 5 | — | — | 2 | — | 8 | 7 | 1:2:7 | 240 | 10 | 20 |

TABLE 4

| | DATA 1 no.% OF ≤1 μm MAX. SIZE GRAINS [%] | DATA 2 MAX. no. % [%] | DATA 3 MEDIAN 1 (≥5%) μm | DATA 4 MEDIAN 2 (≥10%) μm | DATA 5 ASPECT RATIO | WORKABLE LENGTH [km] | LIFE ENDED BY | TOTAL SCORE |
|---|---|---|---|---|---|---|---|---|
| EX. 11 | 86 | 18 | 0.2~1.6 | 0.2~1.1 | 7.7 | 1.6 | FLAKING | ◯ |
| EX. 12 | 93 | 22 | 0.2~1.0 | 0.2~0.9 | 9.5 | 2 | FLAKING | ◎ |
| COMP. 9 | 64 | 15 | 0.1~2.2 | 0.2~1.8 | 4.2 | 1.5 | BREAKAGE | x |

In the column of TOTAL SCORE in TABLE 4, rating "◎◯" denotes a case of the longest workable length to flaking (i.e., the most excellent characteristic). Rating "◯" denotes a case of the second long workable length to flaking (i.e., good characteristic). Rating "X" denotes a case of a short workable length to breakage (i.e., poor characteristic).

As is clear from TABLE 4, samples of Examples 11 and 12, satisfying the aforementioned condition 1, exhibited the longest workable length to flaking, which is preferred.

In contrast, a sample of Comparative Example 9 exhibited a short workable length to breakage, which is not preferred.

4. Other Embodiments

Needless to say, the present disclosure is not limited to the aforementioned embodiments. It should be understood that various modifications and variations may be carried out, so long as they do not deviate from the scope of the present disclosure.

(1) As mentioned above, the present disclosure may encompass not only a silicon nitride-based sintered body including silicon nitride grains, but also a silicon nitride-based sintered body including sialon grains.

As shown in FIG. 4 above, the grain size distribution profile of silicon nitride grains is similar to that of sialon grains as silicon nitride-based grains.

(2) The crystal type (i.e., crystal phase) of sialon may be selected from α, β, and polytype, which may be included at specific proportions in accordance with, for example, use. That is, no particular limitation is imposed on the crystal type of sialon.

(3) In one mode, the silicon nitride-based sintered body of the present disclosure comprises silicon nitride in an amount of 80 mass % or more, yttrium or at least one rare earth element in an amount of 0.1 to 10 mass % in term of oxide, and magnesium in an amount of 0.2 to 6 mass % in term of MgO. Alternatively, the aforementioned silicon nitride-based sintered body may comprise silicon nitride in an amount of 90 mass % or more, yttrium or at least one rare earth element in an amount of 0.3 to 4.5 mass % in term of oxide, and magnesium in an amount of 0.2 to 3 mass % in term of MgO. Still alternatively, the aforementioned silicon nitride-based sintered body may comprise sialon, yttrium or at least one rare earth element in an amount of 1 to 10 mass % in term of oxide, and aluminum in an amount of 3 to 30 mass % in term of $Al_2O_3$. Yet alternatively, the aforementioned silicon nitride-based sintered body may comprise sialon, yttrium or at least one rare earth element in an amount of 3 to 7 mass % in term of oxide, and aluminum in an amount of 5 to 25 mass % in term of $Al_2O_3$.

(4) Notably, one element of each of the aforementioned embodiments may dividedly provide a plurality of functions, or a plurality of elements may be integrated to one element.

Needless to say, any of the aforementioned elements may be omitted. Alternatively, a part of the elements of the aforementioned embodiments may be added to another embodiment, or may be substituted by an element of one of the other embodiments. Any embodiments falling within the technical concept which are specified by the claim of the present invention are included in the embodiments of the invention.

The invention claimed is:

1. A silicon nitride-based sintered body containing silicon nitride-based grains, which are formed of silicon nitride grains or sialon grains, wherein:
   when the size of each silicon nitride-based grain is represented by its maximum grain size, the ratio of the number of silicon nitride-based grains having a maximum grain size of 1 μm or less to the number of the entire silicon nitride-based grains is 70% or higher, and
   in the distribution profile of no. % of silicon nitride-based grains with respect to maximum grain size, the maximum value of no. %, i.e., the maximum no. %, of silicon nitride-based grains is 15 no. % or higher,
   wherein the silicon nitride-based grains include grains having a maximum grain size of 7 μm or greater and having an aspect ratio of 2 or higher.

2. A silicon nitride-based sintered body according to claim 1, wherein the percentage of the number of silicon nitride-based grains having a maximum grain size of 1 μm or less is 85% or higher.

3. A silicon nitride-based sintered body according to claim 1, wherein, when a range of the maximum grain size is divided into segments each having a specific width, the number of silicon nitride-based grains falling within each segment with respect to the number of the entire silicon nitride-based grains is employed as the no. %.

4. A silicon nitride-based sintered body containing silicon nitride-based grains, which are formed of silicon nitride grains or sialon grains, wherein:
   the size of each silicon nitride-based grain is represented by its maximum grain size;
   when a range of the maximum grain size is divided into segments each having a specific width, the number of silicon nitride-based grains falling within each segment with respect to the number of the entire silicon nitride-based grains is employed as unit no. %;
   separately, a 5% level of the maximum value of no. % of silicon nitride-based grains, i.e., maximum no. %, is defined as a threshold value, and a plurality of specific segments which are present at a no. % level equal to or higher than the threshold value are provided; and
   when, among the specific segments, a segment corresponding to the smallest maximum grain size is defined as a smallest segment, and a segment corresponding to the greatest maximum grain size is defined as a greatest segment, the maximum grain size corresponding to the median width of the smallest segment, and the maximum grain size corresponding to the median width of the greatest segment fall within a range of 0.1 µm to 2.0 µm.

5. A silicon nitride-based sintered body according to claim 1, which comprises silicon nitride in an amount of 80 mass % or more, yttrium or at least one rare earth element in an amount of 0.1 to 10 mass % in term of oxide, and magnesium in an amount of 0.2 to 6 mass % in term of MgO.

6. A silicon nitride-based sintered body according to claim 1, which comprises silicon nitride in an amount of 90 mass % or more, yttrium or at least one rare earth element in an amount of 0.3 to 4.5 mass % in term of oxide, and magnesium in an amount of 0.2 to 3 mass % in term of MgO.

7. A silicon nitride-based sintered body according to claim 1, which comprises sialon, yttrium or at least one rare earth element in an amount of 1 to 10 mass % in term of oxide, and aluminum in an amount of 3 to 30 mass % in term of $Al_2O_3$.

8. A silicon nitride-based sintered body according to claim 1, which comprises sialon, yttrium or at least one rare earth element in an amount of 3 to 7 mass % in term of oxide, and aluminum in an amount of 5 to 25 mass % in term of $Al_2O_3$.

9. A cutting insert, which is formed of a silicon nitride-based sintered body as recited in claim 1.

10. A silicon nitride-based sintered body according to claim 4, wherein the silicon nitride-based grains having a maximum grain size of 7 µm or greater have an aspect ratio of 2 or higher.

11. A silicon nitride-based sintered body according to claim 4, which comprises silicon nitride in an amount of 80 mass % or more, yttrium or at least one rare earth element in an amount of 0.1 to 10 mass % in term of oxide, and magnesium in an amount of 0.2 to 6 mass % in term of MgO.

12. A silicon nitride-based sintered body according to claim 4, which comprises silicon nitride in an amount of 90 mass % or more, yttrium or at least one rare earth element in an amount of 0.3 to 4.5 mass % in term of oxide, and magnesium in an amount of 0.2 to 3 mass % in term of MgO.

13. A silicon nitride-based sintered body according to claim 4, which comprises sialon, yttrium or at least one rare earth element in an amount of 1 to 10 mass % in term of oxide, and aluminum in an amount of 3 to 30 mass % in term of $Al_2O_3$.

14. A silicon nitride-based sintered body according to claim 4, which comprises sialon, yttrium or at least one rare earth element in an amount of 3 to 7 mass % in term of oxide, and aluminum in an amount of 5 to 25 mass % in term of $Al_2O_3$.

15. A cutting insert, which is formed of a silicon nitride-based sintered body as recited in claim 4.

* * * * *